(No Model.)  2 Sheets—Sheet 1.

J. Q. ADAMS.
CULTIVATOR.

No. 331,365. Patented Dec. 1, 1885.

Witnesses
P. E. Renneino
W. C. Cooley

Inventor
John Q. Adams
By Coburn & Thacher
Attorneys

N. PETERS, Photo-Lithographer, Washington, D. C.

(No Model.) 2 Sheets—Sheet 2.
J. Q. ADAMS.
CULTIVATOR.
No. 331,365. Patented Dec. 1, 1885.
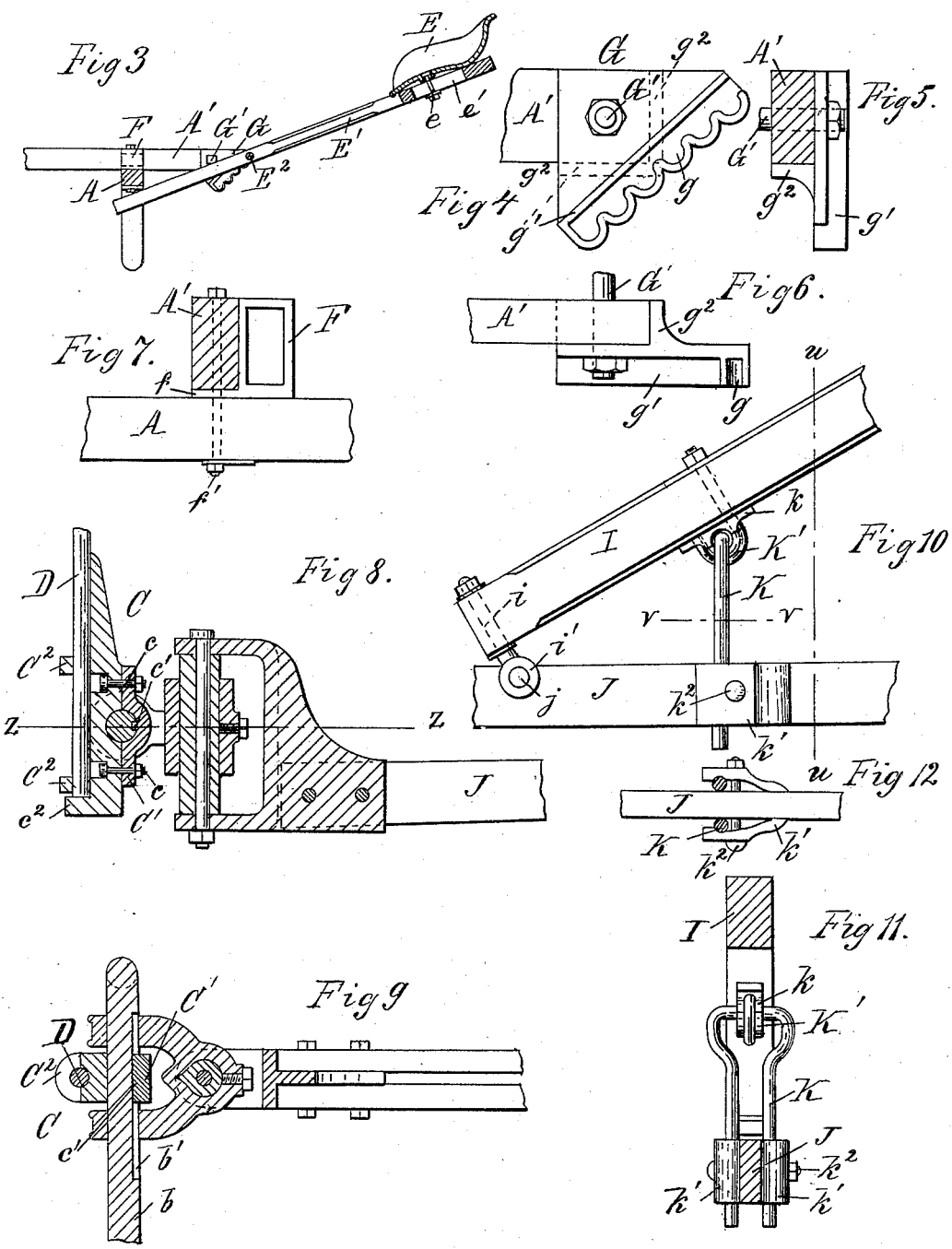
Witnesses
P. E. Rennemo
W. C. Coilies
Inventor
John Q. Adams
By Coburn & Thacher
Attorneys

UNITED STATES PATENT OFFICE.

JOHN Q. ADAMS, OF MARSEILLES, ILLINOIS.

CULTIVATOR.

SPECIFICATION forming part of Letters Patent No. 331,365, dated December 1, 1885.

Application filed February 9, 1885. Serial No. 155,428. (No model.)

*To all whom it may concern:*

Be it known that I, JOHN Q. ADAMS, a citizen of the United States, residing at Marseilles, in the county of La Salle and State of Illinois, have invented certain new and useful Improvements in Cultivators, which are fully set forth in the following specification, reference being had to the accompanying drawings, in which—

Figure 1:
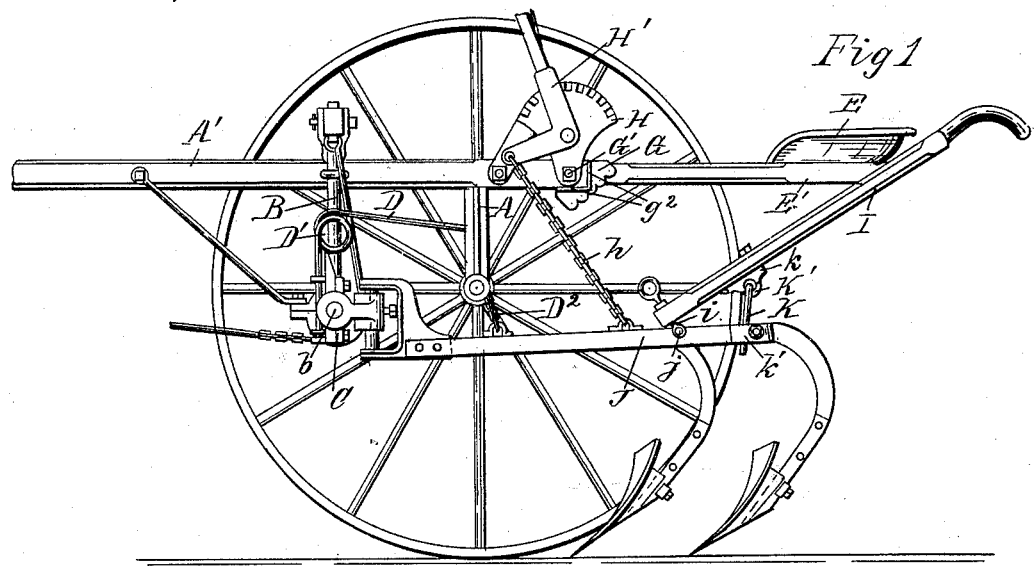
Figure 2:
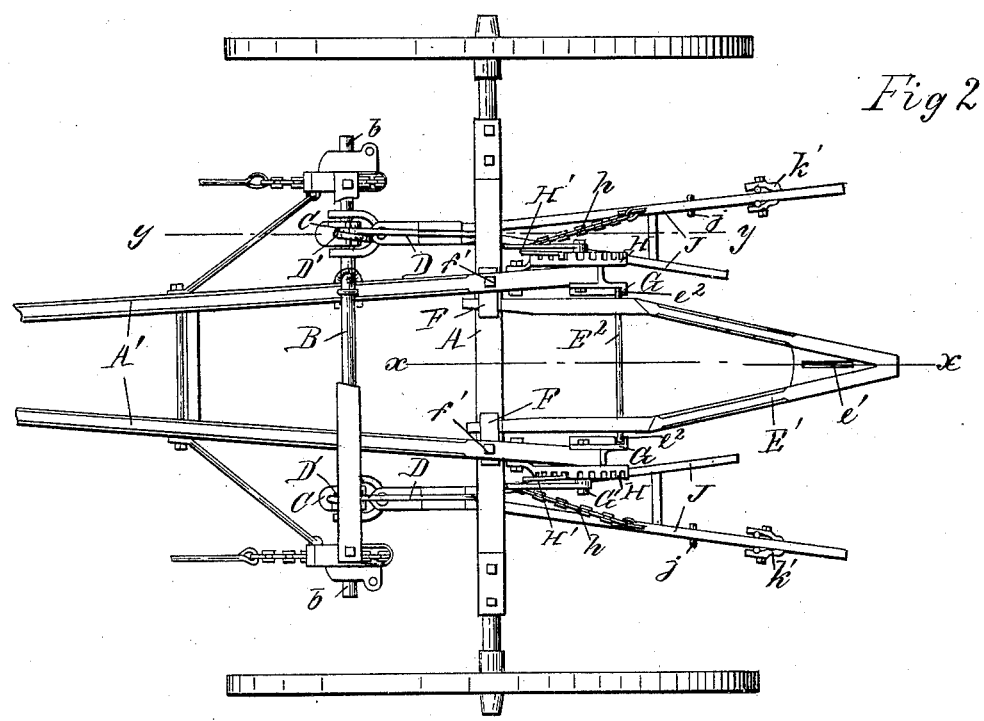

Figure 1 is a side elevation of a cultivator embodying my invention, one wheel thereof being removed; Fig. 2, a plan view of the same; Fig. 3, a detail sectional view of the same on the line $x\,x$ of Fig. 2; Fig. 4, a detail side elevation of one of the brackets which support the seat bar or frame; Fig. 5, a detail front elevation of the same; Fig. 6, a detail plan view of the same; Fig. 7, a detail view of one of the sockets which receive the front ends of the seat-frame; Fig. 8, a detail sectional view on the line $y\,y$ of Fig. 2; Fig. 9, a plan section taken on the line $z\,z$ of Fig. 8; Fig. 10, a detail view showing the attachment of one of the handles; Fig. 11, a sectional view of the same on the line $u\,u$ of Fig. 10, and Fig. 12 a detail plan section on the line $v\,v$ of Fig. 10. Figs. 1 to 3, inclusive, are on the same scale, while Figs. 4 to 12, inclusive, are on the same scale with respect to each other, but on an enlarged scale with respect to the remaining figures.

Like letters refer to like parts in all the figures of the drawings.

My invention relates to cultivators, and more particularly to that class known as "wheel-cultivators," and it is in the nature of an improvement on the cultivator set forth in Letters Patent No. 266,066, granted to me October 17, 1882; and it consists in certain novel features, which I will now proceed to describe, and then specifically point out in the claims.

In the drawings, A represents the axle, provided with the usual supporting-wheels; and A', the branching pole secured on the said axle. In my former patent, hereinbefore specified, the cultivator-beams are attached directly to this axle, so that they extend quite a distance to the rear thereof. According to my present invention these beams are attached to a transverse yoke, B, of substantially the same shape as the axle in my former patent, this yoke being secured upon the branching pole A' at a suitable distance in front of the axle A, as shown. The extremities $b$ of the yoke B are provided with a splined groove, $b'$, as in my former patent; but the bracket C, secured thereon, is differently constructed, being made in two parts, substantially as shown in Fig. 8 of the drawings, each part being provided with a semi-cylindrical recess or groove to receive the end $b$ of the yoke, and the part C' being also provided with a tongue or projection, $c'$, to enter the groove $b'$. The parts of the bracket are secured together by means of bolts $c$, so that they may be readily separated to remove the bracket from the yoke or clamped together on the said yoke at any desired point on the grooved portion $b$ thereof, the spline or projection $c'$ preventing any rotation of the bracket when in position. The cultivator-beams are connected to the yoke in the same manner and by the same means as are employed in my former patent, hereinbefore specified, to which reference is made for a description thereof. The front face of each bracket C is provided with perforated lugs $C^2$, two being shown in the present instance, though more may be employed, and at the lower end of the bracket is formed a projection or stop, $c^2$, in line with the perforations in the lugs $C^2$.

D indicates the supporting-spring, which passes down through the lugs $C^2$, being pivoted therein and having its lower end resting upon the projection or stop $c^2$, substantially as shown in Fig. 8. The spring is cylindrical at its lower end, and preferably throughout, so that it pivots directly in the lugs $C^2$, thus dispensing with the separate piece employed in conjunction with the flat spring shown in my patent hereinbefore referred to. The spring D is formed into a coil at a point above the bracket C, as shown at D' in Fig. 1, and extends rearward from this point about as far as the axle A, where its free end is connected by means of the chain $D^2$ to the corresponding cultivator.

By reason of the supporting-springs being pivoted on a vertical axis they are capable of following the lateral movement of the cultivators, so that they will always be in line with the same, and not exert any lateral strain upon them which would tend to draw them from the position in which it is desired to hold them.

The construction of these parts just described is identical on each side of the machine, the arrangement being reversed, as shown.

The driver's seat E is attached to the seat-frame E' by means of a bolt, $e$, passing through a slot, $e'$, in the rear of the said frame, by means of which the said seat can be adjusted forward or backward at will, to suit the convenience of the driver.

The seat-frame E' is attached to the frame of the machine, either in the manner shown in Figs. 1 and 2 or in the manner shown in Fig. 3. In the former case the forward end of the bars composing the frame passed through suitable sockets, F, secured on the axle A, these sockets being provided with a lateral flange, $f$, upon their bottom portion to pass under the branching pole, as shown in Fig. 7 of the drawings, the bolt $f'$, which secures the branching pole on the axle, passing through this flange also, while the side of the socket F fits up snugly against the side of the branching pole, as shown. By this construction not only is any working loose of the socket F prevented, but the flange $f$ also acts as a washer between the pole A' and the axle A, to prevent any wear of these parts which would tend to work them loose.

The seat-frame E' is provided with a transverse rod or bar, $E^2$, which extends slightly beyond the frame on each side, forming projections $e^2$. These projections may be formed separately on the exterior of the frame, dispensing with the use of the rod $E^2$; but I deem the construction shown preferable. The projections $e^2$ rest in suitable notched brackets, G, attached to the rear ends of the branching pole, and serve, in conjunction with the sockets F, to support the seat-frame E', as shown in Figs. 1 and 2.

The bracket G is constructed substantially as shown in Figs. 4, 5, and 6 of the drawings, consisting of a plate provided with a series of notches, $g$, along its inclined edge, and a guard-flange, $g'$, extending up above the said notches. The plate is also provided with two flanges, $g^2$, arranged at right angles to each other, the one fitting underneath the branch pole and the other over the end thereof, and serving, in conjunction with a suitable retaining bolt or bolts, G', to hold the bracket G firmly in place upon the end of the branching pole.

When it is desired to adjust the height of the seat E, the seat-frame is attached in the manner shown in Fig. 3 of the drawings, the forward end of the frame passing underneath the axle A, as shown, while the projections $e^2$ are placed in the notches $g$ of the bracket G, that notch being employed which will give the seat the desired height. It is evident that with the seat-frame attached in this manner the position of the seat may be readily changed by moving the projections $e^2$ from one set of notches to the other, as desired.

In order to raise and lower the cultivators and properly regulate their position, I attach to the frame of the machine a notched segment, H, with which engages a spring-catch on the pivoted crank-lever H', the end of which is connected by means of a chain, $h$, to the cultivator, so that by operating the said lever the cultivator will be raised or lowered in an obvious manner. This device is also arranged in duplicate, one on each side of the machine, as shown, each segment H being shown as attached to the branching pole by means of the same bolt, G', which secures the corresponding bracket, G.

The handles I are attached to the cultivator-beams J by a universal joint, preferably in the manner shown in detail in Figs. 10, 11, and 12 of the drawings, in which $i$ represents a pivot-bolt passing loosely through the forward end of the handle I and provided with an eyelet, $i'$, through which passes a pivot-bolt, $j$, mounted in the beam J. By this means a radial adjustment in two directions is imparted to the handle I—i. e., either in a vertical plane around the pivot $j$, or in an inclined plane at right angles thereto around the pivot $i$. In order to properly support the handle in the rear of these pivots and secure it after adjustment, I employ a U-shaped staple or bar, K, shaped substantially as shown in Fig. 11, the upper or yoke portion being clamped against the under side of the handle, or preferably against the grooved bearing-plate $k$ thereon, as shown, by means of a hook-bolt, K', while its lower extremities pass down on each side of the beam J and are clamped against the same by means of clamp-plates $k'$, connected by a suitable bolt, $k^2$, passing through the said plates and through the beam, substantially as shown in Fig. 12 of the drawings. By this means the bar K may be raised to any desired height, the handle I turning upon the pivot $j$ and clamped by means of the clamp-plates $k'$, while the handle may be set at any desired angle in relation to the beam by turning it upon the pivot $i$, the hook-bolt K' sliding upon the upper or yoke portion of the bar K, and when so adjusted the handle may be clamped in position by tightening up the hook-bolt in an obvious manner.

It will be seen that by attaching the cultivators to a yoke arranged in front of the axle instead of to the axle itself, a better balance of the parts will be obtained, by means of which provision is made for the attachment of the seat and for the proper arrangement of the cultivators relatively to the seat.

The evener and draft devices shown are identical with those described in my former patent, hereinbefore specified, and need no description here, as they form no part of my present invention.

It is obvious that various mechanical modifications may be made in the details of construction hereinbefore described, and shown in the drawings, without departing from the principle of my invention, and I therefore do not wish to be understood as limiting myself strictly to the details set forth.

Having thus described my invention, what I claim as new, and desire to secure by Letters Patent, is—

1. The combination, with the yoke B, having spline-groove $b'$, of the two-part bracket C, having the adjacent faces of its parts grooved, as described, to fit upon the said yoke B, one of said parts being provided with the projection $c'$, to enter the groove $b'$, and the supporting-spring attached to the said bracket, substantially as and for the purposes specified.

2. The combination, with the yoke B, having splined groove $b'$, of the bracket C, consisting of two parts connected together by bolts $c$, said parts being adapted to fit upon the said yoke, and one of them being provided with a projection, $c'$, to enter the groove $b'$, and the other provided with perforated lugs $C^2$ and an end stop or projection, $c^2$, to receive and support the spring D, substantially as and for the purposes specified.

3. The combination, with the seat-frame E', having projections $e^2$, of the branching pole A', provided with brackets G, to receive the said projections, and the axle A, provided with sockets F, to receive the forward ends of the seat-frame, substantially as and for the purposes specified.

4. The combination, with the branching pole A' and the axle A, secured thereto, of the socket F, provided with a lateral flange, $f$, secured between the branching pole and axle, substantially as and for the purposes specified.

5. The combination, with the branching pole A', of the bracket G, provided with the inclined series of notches $g$ and the guard-flange $g'$, substantially as and for the purposes specified.

6. The combination, with the branching pole A', of the bracket G, provided with the inclined series of notches $g$ and guard-flange $g'$, and having flanges $g^2$ arranged at right angles to each other, and fitting against the end of the branching pole, substantially as and for the purposes specified.

7. The combination, with the cultivator-beam J, of the handle I, mounted on the pivot $i$, which is itself mounted on a pivot, $j$, arranged at right angles thereto in the cultivator-beam, and an adjustable support on the said handle, arranged in the rear of the said pivots, substantially as and for the purposes specified.

8. The combination, with the cultivator-beam, of the handle I, connected thereto by a universal joint, whereby the said handle may be moved to any desired position by a single direct movement, and a vertically-adjustable support for the said handle, secured to the cultivator-beam, and upon which said handle is laterally adjustable, substantially as and for the purposes specified.

9. The combination, with the cultivator-beam J, of the handle I, connected thereto by a universal joint, and the U-shaped bar or staple K, embracing the said beam and adjustably clamped thereto, the handle I being provided with a hook-bolt, K', by means of which it is adjustably clamped upon the transverse upper portion of the bar K, substantially as and for the purposes specified.

10. The combination, with the handle-support K, embracing the cultivator-beam, of the clamping-plates $k'$, arranged on each side of the said beam, and a bolt, $k^2$, connecting the said clamping-plates and passing through the beam, substantially as and for the purposes specified.

11. The combination, with the yoke B and the cultivator-beams loosely coupled thereto, of the brackets C, provided with perforated lugs $C^2$ and stops $c^2$, and the springs D, having their lower ends pivoted in said lugs and resting on said stops, and having their free rear ends suitably connected to the cultivator-beams, substantially as and for the purposes specified.

JOHN Q. ADAMS.

Witnesses:
C. L. STINSON,
C. N. WARD.